United States Patent [19]

Kitazawa et al.

[11] Patent Number: 5,025,276
[45] Date of Patent: Jun. 18, 1991

[54] CONTROL APPARATUS OF SINGLE-LENS REFLEX CAMERA

[75] Inventors: Toshiyuki Kitazawa, Tokyo; Masahiko Kurosaki, Kanagawa; Yutaka Ohsawa, Tokyo, all of Japan

[73] Assignee: Asahi Kogaku Kogyo Kabushiki Kaisha, Tokyo, Japan

[21] Appl. No.: 565,153

[22] Filed: Aug. 10, 1990

[30] Foreign Application Priority Data

Aug. 22, 1989 [JP] Japan ................................. 1-215466

[51] Int. Cl.$^5$ ............................................. G03B 19/12
[52] U.S. Cl. .................................................. 354/152
[58] Field of Search ............................... 354/152, 153

[56] References Cited

U.S. PATENT DOCUMENTS

| | | | |
|---|---|---|---|
| 4,349,261 | 9/1982 | Kurei | 354/152 |
| 4,360,257 | 11/1982 | Kurei | 354/152 X |
| 4,881,097 | 11/1989 | Ishiguro | 354/152 X |

FOREIGN PATENT DOCUMENTS 2011098 7/1979 United Kingdom .

OTHER PUBLICATIONS

United Kingdom Search Report, application No. 9017873.2, Nov. 13, 1990.

Primary Examiner—Michael L. Gellner
Attorney, Agent, or Firm—Sandler, Greenblum & Bernstein

[57] ABSTRACT

A control apparatus of a single-lens reflex camera, including a mirror which moves between a charge completion position and a photographing position and a mirror driving mechanism for moving the mirror between the charge completion position and the photographing position. A mirror holding mechanism for maintaining the mirror at the charge position, a mirror charge detecting device for detecting the completion of the mirror charge, a mode setting device for setting a continuous photographing mode, and a control device for releasing the hold of the mirror by the mirror holding mechanism when the mirror charge detecting device detects the charge completion position of the mirror, at the continuous photographing mode are also provided.

23 Claims, 5 Drawing Sheets

CONTROL APPARATUS OF SINGLE-LENS REFLEX CAMERA

BACKGROUND OF THE INVENTION

1. Field of the Invention

The present invention relates to a control apparatus of a single-lens reflex camera, and more precisely, it relates to a control apparatus of a single-lens reflex camera in which a film (frame) advance speed is increased in a continuous photographing mode.

2. Description of the Related Art

There is a known single-lens reflex camera which has an automatic winder for continuous photographing. In such a known single-lens reflex camera, in order to take a picture of a second and subsequent frames, the subsequent shutter release operation can start only when the film (frame) is advanced and the mechanical charge is completed.

The "mechanical charge" referred to herein includes a mirror charge for moving a mirror down to a lowermost position (charge completion position or viewing position) against a spring which biases the mirror upward toward a photographing position, a shutter charge for returning the leading and trailing curtains of a shutter to their respective initial positions against respective springs which move the leading and trailing curtains, and a diaphragm charge for moving a diaphragm lever for stopping-down toward an open position against a spring which biases the diaphragm lever in the stopping-down direction. When these charges are finished, or charged the finished states are maintained by respective mechanical engaging members.

After the mechanical charges are completed and the mechanical engaging members are engaged, the photographing (releasing) occurs by sequentially disengaging the mechanical engaging members. Accordingly, in a continuous photographing mode, the photographing operations for frames after the first frame are commenced when all of the mechanical charges are finished and the engagement of the mechanical engaging members are completed.

In a conventional single-lens reflex camera, as mentioned above, generally speaking, the mirror charge is completed before the shutter charge is completed, since the spring for driving the mirror is usually weaker than the spring for moving the shutter and since the blackout time in which no image can be visually confirmed through a finder should be as short as possible.

However, in a continuous photographing mode in a known single-lens reflex camera, the release operation commences after all the mechanical charges are finished. Consequently, there is a limit to a reduction of time interval from the completion of the exposure of the one frame to the commencement of exposure of a subsequent frame. The time interval will be referred to as a "frame advance speed" hereinafter. Namely, in a conventional single-lens reflex camera, since the mirror charge is released after the shutter charge is completed and the shutter charge is then released after the upward movement of the mirror ends, the frame advance speed is decreased by a time delay corresponding to a space of time between the completion of the mirror charge and the completion of the shutter charge.

SUMMARY OF THE INVENTION

The primary object of the present invention is to provide a control apparatus for a single-lens reflex camera in which the frame advance speed in a continuous photographing mode can be increased.

The inventors of the present invention have focused on the fact that the mirror charge is finished prior to the completion of the mirror charge, and accordingly, the time necessary for the mirror charge is shorter than the time necessary for the shutter charge.

The present invention is characterized in that the upward movement of the mirror is commenced before the shutter charge is completed in the continuous photographing mode.

With this feature, in the continuous photographing mode, since the upward movement of the mirror is effected before other mechanical charges are finished, the space of time from the completion of the mirror charge to the commencement of the upward movement of the mirror can be shortened, so that the frame advance speed is increased.

If the total time necessary for the mirror charge and for the upward movement of the mirror is set to be shorter than the time of the shutter charge, the upward movement of the mirror is completed before the shutter charge is finished, and accordingly, the shutter can be moved as soon as the shutter charge is completed. Thus, there is no waiting time for the upward movement of the mirror, and accordingly, the frame advance speed can be increased.

According to an aspect of the present invention, there is provided a control apparatus of a single-lens reflex camera, comprising a mirror which moves between a charge completion position and a photographing position, and a mirror driving mechanism for moving the mirror between the charge completion position and the photographing a mirror holding mechanism for maintaining the mirror at the charge completion position is also provided. A mirror charge detecting mechanism for detecting the completion of the mirror charge, a mode setting mechanism for setting a continuous photographing mode, and a control device for releasing the hold of the mirror by the mirror holding mechanism when the mirror charge detecting mechanism detects the charge completion position of the mirror, in the continuous photographing mode are also provided.

With this arrangement, since the leading curtain begins moving upon the completion of the film winding after the completion of the shutter charge, the frame advance speed can be increased.

BRIEF DESCRIPTION OF THE DRAWINGS

The invention will be described below in detail with reference to the accompanying drawings, in which.

DESCRIPTION OF THE PREFERRED EMBODIMENTS

Figure 1A:
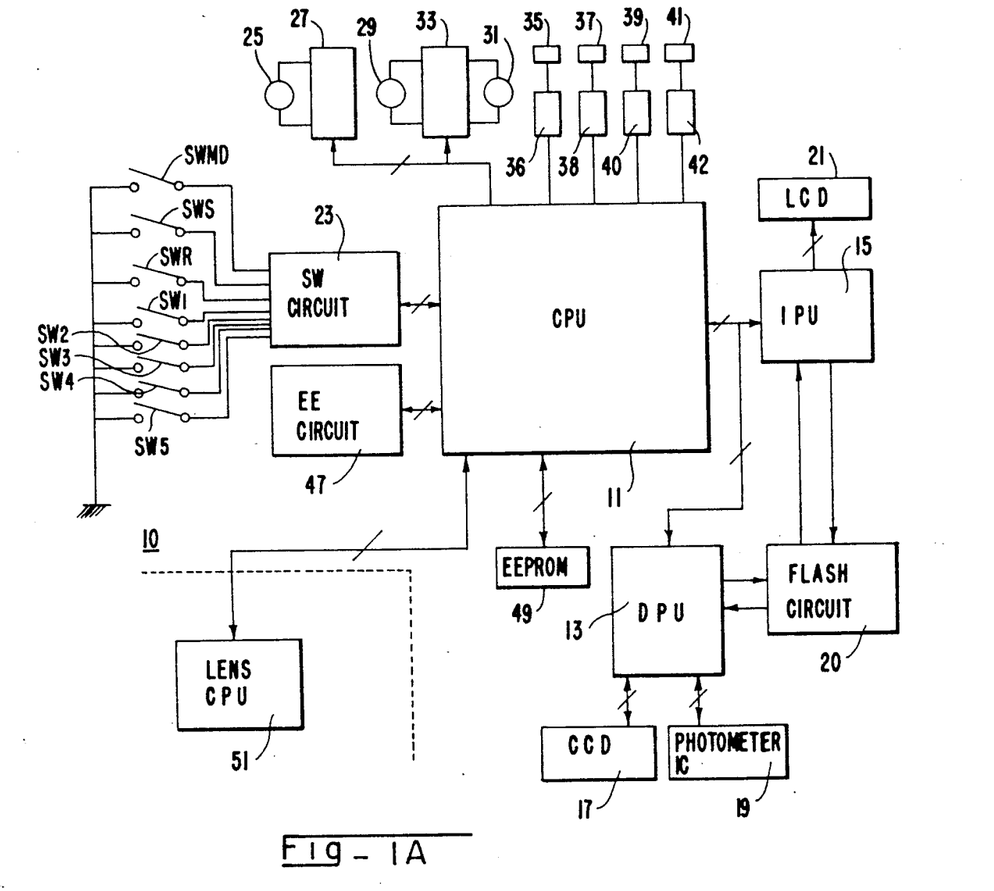
FIG. 1A is a block diagram of a control circuit of a single-lens reflex camera according to an embodiment of the present invention.
Figure 1B:
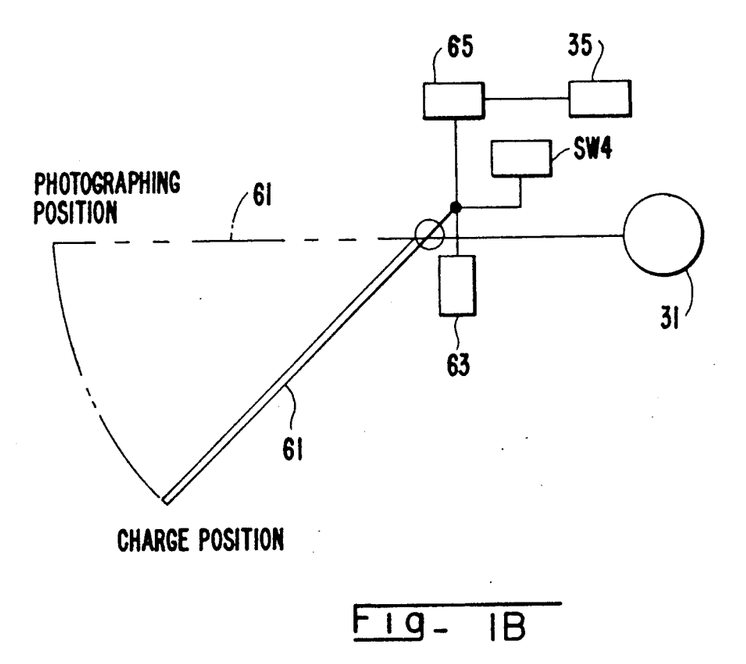
FIG. 1B is a block diagram of a mirror driving system of a single-lens reflex camera, shown in FIG. 1A.

The control system shown in FIGS. 1A and 1B which show block diagrams of main components of a single-lens reflex camera to which the present invention is applied includes a main CPU (Central Processing Unit) 11, a DPU (Data Processing Unit) 13, and a IPU (Indication Processing Unit) 15, connected to each other through a bus line.

The main CPU 11 is a microcomputer which generally controls the DPU 13, the IPU 15 and the whole system of the single-lens reflex camera and performs the arithmetic operations for automatic focusing and exposure value.

The DPU 13 mainly functions on one hand as an interface for outputting an object distance signal and a luminance signal issued by a CCD sensor 17 and a photometer sensor 19, respectively, and on the other hand as a flash controller for controlling an emission of flash light through a flash circuit 20.

The IPU 15 mainly functions as an indication controller for indicating photographing information, such as an exposure mode, the number of frames in which pictures have been taken, a shutter speed, a diaphragm value and flash information, in a display panel 21.

To a switch circuit 23 which is connected to the main CPU 11 are connected a photometer switch SWS, a release switch SWR, and a mode switch SWMD which is manually actuated by a photographer to select photographing modes, such as a continuous photographing mode, a single picture taking mode, and a bulb exposure mode. The mode switch SWMD and the main CPU 11 constitute a continuous mode setting means.

The photometer switch and the release switch are associated with a release button (not shown), so that when the release switch is pushed by a half step and a full step, the photometer switch SWS and the release switch SWR are turned ON, respectively.

To the switch circuit 23 are connected a shutter charge detection switch SW1 for detecting the movement of the shutter curtain to its initial position, a winding detection switch SW2 for detecting the completion of the film winding operation, a trailing curtain movement completion switch SW3, a mirror charge detection switch SW4 for detecting the movement of the mirror 61 to the lowermost position (viewing position), and a wind pulse generation switch SW5.

The shutter charge detection switch SW1 detects the completion of the shutter charge when the shutter curtains (the leading curtain and the trailing curtain) are moved to the charge completion position (initial position) against the biasing force of the charging member (spring). The shutter charge detection switch SW1, which is in association with the shutter curtains, is turned ON when the shutter curtains are moved to the initial position to detect the completion of the shutter charge.

The wind detection switch SW2, which is in association with the winding operation of the film, is turned ON to detect the completion of the winding operation of the film when the film is wound by one frame to come to a position in which a picture can be taken.

The trailing curtain movement completion switch SW3, which is in association with the trailing curtain, is turned ON to detect the completion of the movement of the trailing curtain (completion of exposure) when the movement of the trailing curtain is completed.

The mirror charge detection switch SW4, which is associated with the mirror 61 is turned ON when the mirror 61 is moved down to the lowermost position (viewing position) against the biasing force of the mirror driving member (spring) 63, that is, when the mirror charge is completed. When the mirror 61 comes to the charge completion position, it is maintained in that position by the engaging member (holding means) 65 against the mirror driving member 63.

The wind pulse generation switch SW5 is associated with the sprocket (not shown), which is rotated by the movement of the film, to generate the pulses. The wind pulse generation switch SW5 is realized for example, by a rotational cam plate which rotates in association with the sprocket and a switch which is turned ON and OFF in accordance with the rotation of the cam plate, or by a rotational slit disc which rotates in association with the sprocket and a photo interrupter which detects the slit of the slit disc in accordance with the rotation of the slit disc.

The illustrated single-lens reflex camera has three motors; AF (automatic focusing) motor 25 for driving the focusing lens, a rewinding motor 29 as a second driving means, and a mechanical charge motor 31 as a driving means. The AF motor 25 is controlled by the main CPU 11 through a motor driver 27. The rewinding motor 29 and the mechanical charge motor 31 are controlled by the main CPU 11 through a motor driver 33.

The AF motor 25 moves the focusing lens group (not shown) of the photographing lens in the optical axis direction to adjust the focus thereof.

The rewinding motor 29 performs the feeding operation (automatic loading, winding and rewinding) of the film through a known film feeding mechanism.

The mechanical charge motor 31 moves the leading curtain and the trailing curtain of the shutter to their initial positions against the respective springs, moves the stop-down lever for stopping-down the diaphragm in the open direction to the initial position against the spring (diaphragm charging) and moves the mirror 61 down to the initial position against the biasing force of the mirror driving member 63 (mirror charging). The charging members are maintained at the charge completion position by respective mechanical engaging members (not shown). Details of one example of a charging member is disclosed in U.S. Pat. No. 4,349,261, the entire disclosure of which is expressly incorporated herein by reference.

A release magnet 35, a leading curtain magnet 37, a trailing curtain magnet 39, and an EE magnet 41 are connected to the main CPU 11 through magnet drivers 36, 38, 40 and 42.

The magnets 35, 37 and 39 are energized when the release switch SWR is made ON. As a result, the release magnet 35 releases the mechanical engagement of the mirror charge and the diaphragm charge, so that the leading curtain 37 and the trailing curtain 39 electromagnetically engages the shutter charge. The mechanical charge of the shutter charge is released in association with the upward movement of the mirror. After the mechanical charge is released, the supply of the electrical power to the leading curtain magnet 37 and the trailing curtain magnet 39 is stopped, so that the shutter curtains move. The EE magnet 41 is energized at a predetermined time after the releasing to drive the engaging member (not shown) to engage the stop-down lever, thereby to maintain the diaphragm at a predetermined value.

The EE circuit 49 is connected to the main CPU 11 to control the stop-down operation of the diaphragm. The EE circuit 49 has an EE pulse generating device which generates the EE pulses in association with the stop-down lever (not shown) which operates in association with the upward movement of the mirror. The EE pulses are sent to the main CPU 11 which counts the number of the EE pulses. When the counted value is a predetermined value obtained by the arithmetic operation in the main CPU, a signal is supplied to the magnet driver 42, so that the EE magnet 41 is energized to engage the stop-down lever in order to maintain the diaphragm at a predetermined value.

Various photographing data is stored in EEPROM 49 and is read at an appropriate time by the main CPU 11.

The main CPU 11 transmits and receives electrical signals to and from a lens CPU 51 provided on the photographing lens L through groups of electrical contacts provided on the respective mount surfaces. The lens CPU 51 has lens data stored therein, specific to the photographing lens L, such as focal length data, and open diaphragm value and minimum diaphragm value data, etc., which can be read by the main CPU 11.

The DPU 13 is connected to a phase difference detection type of subject distance measuring sensor (CCD sensor) 17 and the photometer sensor 19 which detects the luminance of a subject to be taken. The subject distance measuring sensor 17 is in the form of an CCD image sensor having arrays of a large number of picture elements. The picture signals which are successively output from the subject distance measuring sensor 17 are converted by the DPU 13, to picture data which can be processed in the main CPU 11 and are output to the main CPU 11. The main CPU 11 performs the necessary arithmetic operations in accordance with the picture data from the DPU 13 to detect the amount of non-focus or the out-of-focus amount. The main CPU 11 then detects a displacement of the focusing lens in accordance with the amount of non-focus, so that the AF motor 25 is driven in accordance with the displacement of the required focusing lens to eliminate the out-of-focus condition.

The photometer sensor 19 has a light receiver (not shown) and a logarithmic compression circuit (not shown), so that the output signal of the light receiver which receives light reflected from a subject to be taken is sent to the DPU 13. The DPU 13 controls the photometer sensor 19 and processes the output signal input thereto into photometer data to be fed to the main CPU 11. The main CPU 11 determines the shutter speed and the diaphragm value in accordance with the photometer data and the film sensitivity data, etc.

The DPU 13 is connected to the flash circuit 20 which controls the emission of light of an incorporated or external flashing device. The DPU 13 causes the flashing device to prepare (charge) for flashing through the flash circuit 20, in accordance with a flash preparing signal from the main CPU 11, and then issues a trigger signal to the flash circuit 20 upon receipt of a flash signal from the main CPU 11 to flash.

The DPU 13 which receives the flash preparation completion signal from the flash circuit 20 before flashing, receives a light modulation signal therefrom after flashing to output a predetermined indication signal to the IPU 15 which causes the LCD (Liquid Crystal Display) 21 to indicate a predetermined mark (indication). The LCD 21 is provided above the outer surface of the camera body within a finder field of view.

The indication of the LCD 21 is controlled by the IPU 15 to indicate various photographing data including the above-mentioned flash information. The main CPU 11 transmits and receives data to and from the IPU 15. The photographing data, such as photographing mode data, the number of frames of film on which pictures have been taken, data regarding the focusing state, and the warning that a strobe should be used, etc. are fed from the main CPU 11 to the IPU 15.

Figure 2:
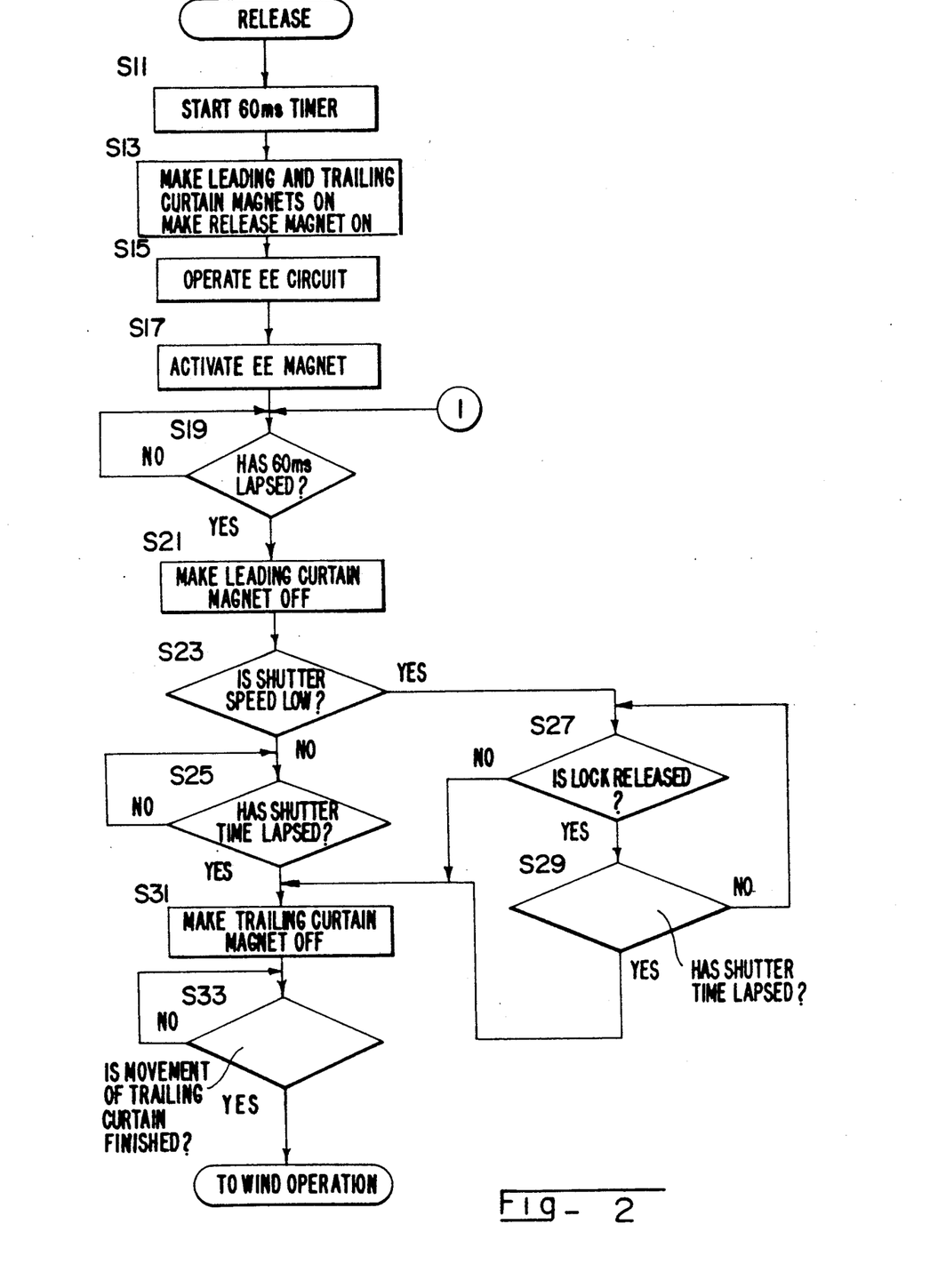
FIGS. 2 and 3 are flow charts of operations of a single-lens reflex camera, shown in FIG. 1A; and, FIG. 4 is a timing chart of a photographing operation of a single-lens reflex camera, shown in FIG. 1A.
Figure 3:
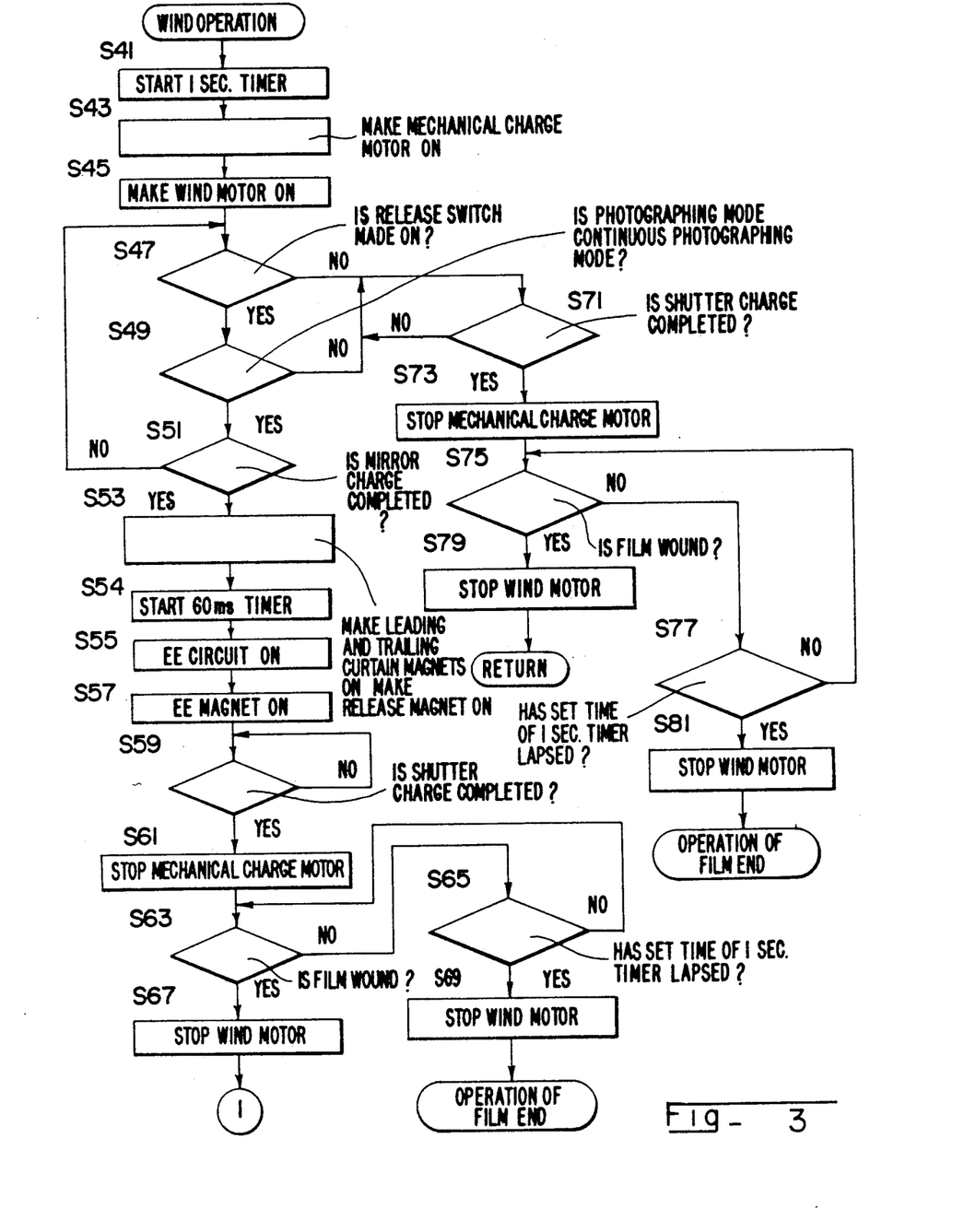
Figure 4:
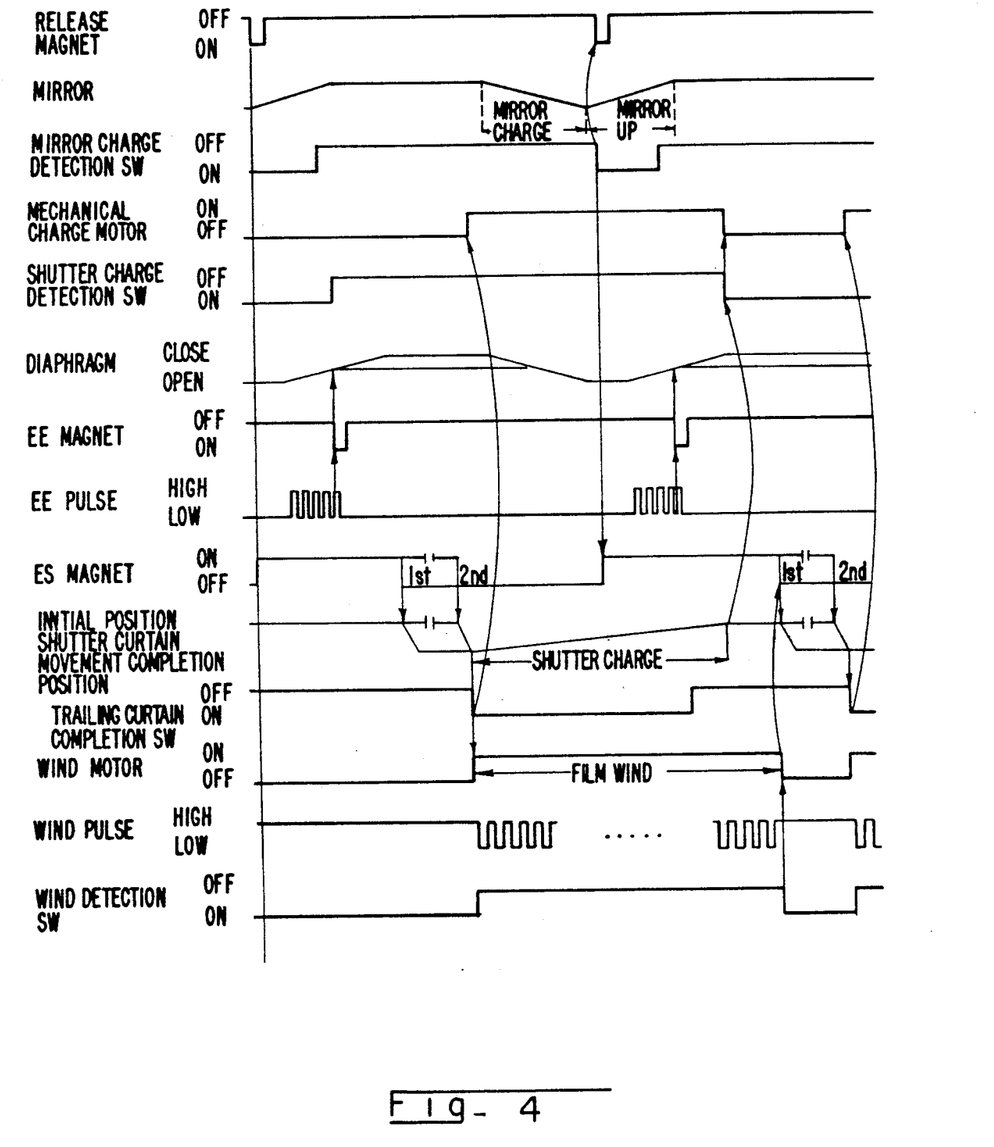

The control apparatus of a single-lens reflex camera as constructed above operates as follows (FIGS. 2, 3 and 4).

The operations are performed by the main CPU 11 in accordance with the program stored therein.

When the shutter button is pushed down by a full step to make the release switch SWR ON, the sub-routine shown in FIG. 2 is fetched. Note that before the release switch SWR is made ON, the photometer switch SWS is first made ON by the operation of the shutter button by a half step to perform the focusing operation and then the arithmetic operation for obtaining the diaphragm value. The diaphragm value (EE pulse number) and the shutter speed, thus obtained are written (i.e. stored) in the internal memory and indicated via the LCD 21.

In the release operation, a 60 ms timer starts at step S11. The 60 ms timer sets a predetermined waiting time in which the mechanical oscillation at the completion of the upward movement of the main mirror 61 during the releasing operation disappears. Namely, no operation is effected during the waiting time which depends on the single-lens reflex camera used.

The leading curtain magnet 37 and the trailing curtain magnet 39 are made ON, so that the leading curtain and the trailing curtain are engaged by the leading curtain magnet 37 and the trailing curtain magnet 39. Thereafter, the release magnet 35 is made ON for a predetermined time (e.g. 5 ms) to release the mirror from the mirror engaging member 65 (step S13). As a result, the mirror begins moving up and the stop-down operation begins. During the upward movement of the mirror, the mechanical engagement of the leading curtain and the trailing curtain is released by the members associated with the upward movement of the mirror, and accordingly, the leading curtain and the trailing curtain are engaged only by the leading curtain magnet 37 and the trailing curtain magnet 39.

Upon the release of the mirror 61, the EE circuit 47 begins counting the number of the EE pulses (step S15). The number of the EE pulses reaches a predetermined value obtained by the arithmetic calculation (exposure operation), the EE magnet 41 is made ON to stop the stop-down operation and to maintain the diaphragm at a predetermined value (step S17). The operation waits until the set time of the 60 ms timer lapses (step S19). In the normal operation, although the upward movement of the mirror is finished before the lapse of the waiting time set by the 60 ms timer, the mechanical vibration which is caused by the stopping of the mirror 61 disappears within the waiting time.

Thereafter, the leading curtain magnet 37 is made OFF, so that the leading curtain moves to start the exposure (step S21). Whether the shutter speed which is manually set by a photographer or obtained by the arithmetic exposure operation is low is checked at step S23. In the illustrated embodiment, the shutter speed is presumed to be a low speed and a high speed when it is equal to or below 1/15 second and equal to or above 1/30 second, respectively. However, the boundary values of the low speed and the high speed can be optionally selected.

If the shutter speed is a high speed at step S23, the trailing curtain magnet 39 is made OFF after the lapse of a predetermined shutter time (second) to move the trailing curtain, thereby to finish the exposure (steps S25 and S31).

Conversely, if the shutter speed is a low speed at step S23, since there is a long time before the trailing curtain begins moving, whether the lock is unlocked and whether the set time (second) has lapsed are repeatedly checked to avoid an irregular operation (steps S27, S29). After the lapse of the set shutter time, the trailing curtain magnet 39 is made OFF to move the trailing curtain (step S31). Thus, the exposure ends.

The operation to check whether the lock is released at step S27 is effected to move the trailing curtain in order to avoid trouble which would otherwise occur when an irregular operation is effected during the exposure. This is usually effected when the main switch is made OFF.

After the trailing curtain magnet 39 is made OFF, whether the movement of the trailing curtain ends is repeatedly checked at step S33. Upon the completion of the movement of the trailing curtain it is detected by the trailing curtain movement completion switch SW3.

If the completion of the movement of the trailing curtain is detected at step S33, the exposure ends, that is, the release operation ends.

After the completion of the release operation, the winding operation for winding the film and performing the mechanical charge, etc. is carried out. FIG. 3 shows a flow chart of the winding operation in the continuous photographing, by way of example.

When the movement of the trailing curtain ends, the main CPU 11 starts the one second timer at step S41. The timer is used to detect the end of the film and the failure to wind the film. The main CPU 11 judges the film end when no winding operation ends within one second (steps S65 and 77) to stop the winding motor 29 (steps S69 and 81).

After a one second timer starts, the main CPU 11 outputs the start signal to the motor drive 33 to start the mechanical charge motor 31 to, thereby commence the mechanical charge (step S43). After the lapse of a predetermined time (e.g. about 20 ms in the illustrated embodiment), the winding motor 20 begins rotating to wind the film (step S45). Namely, the mirror is moved down and thereafter, the film is wound. The reason that there is a time difference between the commencement of the motors 29 and 31 is to prevent an abnormal voltage reduction due to superimposition of the surge current at the commencement of the operation of the two motors.

Thereafter, whether the release switch SWR is made ON, whether the photographing mode is the continuous photographing mode, and whether the mirror charge detection switch SW4 is made ON are repeatedly checked until the mirror charge detection switch SW4 is made ON (steps S47, S49 and S51).

When the mirror charge detection switch SW4 is made ON, the leading curtain magnet 37 and the trailing curtain magnet 39 are supplied with an electrical energy to prepare for the electromagnetic engagement of the leading and trailing curtains. Thereafter, the electrical power is supplied to the release magnet 35 for a predetermined time (e.g. about 5 ms) to disengage the mechanical engagement of the mirror 61 and the diaphragm (step S53). By this, the upward movement of the mirror 61 and the stop-down of the diaphragm are commenced. Thereafter, the 60 ms timer starts (step 54).

Upon the activation of the release magnet 35, the EE circuit 47 operates, so that the main CPU 11 counts the number of the EE pulses which are generated during the stop-down operation (step S55). When a predetermined number of EE pulses are generated, the EE magnet 41 is supplied with an electrical energy for a predetermined time (e.g. 5 ms) to mechanically engage the stop-down lever (step S57), as shown in the timing chart in FIG. 4. As a result, the diaphragm value is determined.

When the shutter charge completion switch SW1 is made ON upon the completion of the shutter charge, the mechanical charge motor 31 is stopped at steps S59 and S61 (FIG. 4).

If the wind completion switch SW2 detects the completion of the winding operation of the film, the wind motor 29 is stopped to return the operation to step S19, mentioned above (steps S63 and S67). Thereafter, the leading curtain and the trailing curtain are moved to effect the exposure for a predetermined time. When the movement of the trailing curtain ends, the operation is returned to the wind operation (step S41).

When a photographer releases the release button to make the release switch SWR OFF, or when the photographing mode is not the continuous photographing mode, the operation proceeds to step S71 from step S47 or step S51. As a result, the mechanical charge motor 31 is stopped after the shutter charge is completed (steps S71 and S73).

When the film is wound, the wind motor 29 is stopped, so that the operation is returned (steps S75 and S79). If the set time of the one second timer lapses before the film winding is finished, the wind motor 29 is stopped to perform the film end treatment, since the film comes to the end (steps S77 and S81).

The above mentioned operations are summarized as follows with reference to FIG. 4.

When a photographer selects the continuous photographing mode to continuously take pictures, the release switch SWR continues to be made ON. In this case, the picture on the first frame of the film is taken in a similar manner to the normal photographing operation.

Namely, as soon as the release switch SWR is made ON in a photographable condition in which a picture can be taken upon the completion of the mechanical charge and the winding of the film, the leading curtain magnet 37 and the trailing curtain magnet 39 are made ON to electromagnetically engage the leading curtain and the trailing curtain. Thereafter, the release magnet 35 is made ON, so that the mirror is disengaged from the mirror engaging member 65. As a result, the upward movement of the mirror 61 and the stop-down operation are commenced by the mirror driving member (spring). During the upward movement of the mirror, the mechanical engagement of the shutter charge is released, and the number of the EE pulses issued from the EE circuit 47 is counted. When a predetermined number of EE pulses are counted, the EE magnet 41 is made ON to maintain the diaphragm at a predetermined diaphragm value. The EE magnet 41 is made ON before the upward movement of the mirror 61 is completed.

After the release switch SWR is made ON, the leading curtain magnet 37 is made OFF 60 ms thereafter to move the leading curtain. After the lapse of a predetermined shutter time (second), the trailing curtain magnet 39 is made OFF to move the trailing curtain. Thus, the photographing of a picture in the first frame is finished.

Thereafter, when the completion of the movement of the trailing curtain is detected by the trailing curtain movement completion switch SW3, the mechanical charge motor 31 starts to effect the downward movement of the mirror and the mechanical charge including the shutter charge, etc. After that, the wind motor 29 starts to wind the film.

When the completion of the mirror charge is detected by the mirror charge detection switch SW4 during the mechanical charge, the release magnet 35 is made ON to release the mechanical engagement of the mirror, so that the mirror is moved up by the spring force. Thereafter, the leading curtain magnet 37 and the trailing curtain magnet 39 are made ON to electromagnetically engage the shutter charge and disengage the engagement of the mecanical shutter charge. When the number of the EE pulses issued from the EE circuit 47 reaches a predetermined value, the EE circuit 41 is made ON to maintain the diaphragm value at a predetermined value.

When the completion of the shutter charge is detected by the shutter charge detection switch SW1, the engagement of the leading and trailing curtains by the leading curtain magnet 37 and the trailing curtain magnet 39 is released. Thereafter, when the completion of the winding of the film is detected by the wind completion switch SW2, the leading curtain magnet 37 is made OFF after the lapse of 60 ms to move the leading curtain. After the lapse of the shutter time, the trailing curtain magnet 39 is made OFF to move the trailing curtain. This finishes the photographing of a picture of the second frame. During the photographing of the subsequent frames, the engagement of the curtains at the completion of the shutter charge is effected only by the leading curtain magnet 37 and the trailing curtain magnet 39, since the upward movement of the mirror is effected before the shutter charge is finished, as mentioned before.

The photographing of the frames subsequent to the second frame is effected in the same way as that of the second frame.

It should be appreciated that the frame advance speed can be further increased by setting the total time for the mirror charge and the upward movement of the mirror and the time of the winding of the film to be shorter than the time of the shutter charge, respectively, since the shutter curtains can be moved as soon as the shutter charge is completed.

Although the mechanical charge is effected by the single motor 31 in the illustrated embodiment, it is possible to effect the mirror charge and the shutter charge by separate motors independent from one another.

Furthermore, although only the downward movement of the mirror 61 is effected by the mechanical charge motor 31 in the above-mentioned embodiment, it is possible to use the mechanical charge motor 31 in order to effect both the upward and downward movements of the mirror. Alternatively, it is also possible to move the mirror 61 upward by a separate motor.

As can be seen from the foregoing, according to the present invention, since the engagement of the mirror is released when the completion of the mirror charge is detected at the continuous photographing mode, the upward movement of the mirror can be effected simultaneously with other operations, resulting in an increase of the frame advance speed.

Furthermore, according to the present invention, at the continuous photographing mode, if the movement of the leading curtain is commenced when the completion of the shutter charge and the completion of the winding of the film are detected, a further increase of the frame advance speed can be expected.

We claim:

1. A control apparatus of a single-lens reflex camera, comprising:
    a mirror which moves between a charge completion position and a photographing position;
    a mirror driving means for moving the mirror between the charge completion position and the photographing position;
    a mirror holding means for maintaining the mirror at the charge completion position;
    a mirror charge detecting means for detecting the completion of the mirror charge;
    a mode setting means for setting a continuous photographing mode; and,
    a control means for releasing the hold of the mirror by the mirror holding means when the mirror charge detecting means detects the charge completion position of the mirror, at the continuous photographing mode.

2. A control apparatus of a single-lens reflex camera, according to claim 1, wherein said mirror driving means comprises a spring member which moving the mirror to the photographing position, and a driving member which moves the mirror to the charge completion position while biasing the spring member.

3. A control apparatus of a single-lens reflex camera, according to claim 2, wherein said driving member comprises a motor.

4. A control apparatus of a single-lens reflex camera, according to claim 3, wherein said mirror holding means comprises an engaging member which holds the mirror at the charge completion position against the spring member.

5. A control apparatus of a single-lens reflex camera, according to claim 4, wherein said control means comprises a magnet which disengages the engaging member.

6. A control apparatus of a single-lens reflex camera, according to claim 1, wherein said driving means comprises a driving member which moves the mirror between the photographing position and the charge completion position, and wherein said mirror holding means stops the driving member when the mirror is in the charge completion position, so that the control means drives the driving member to move the mirror to the photographing position.

7. A control apparatus of a single-lens reflex camera, according to claim 6, wherein said driving member comprises a motor.

8. A control apparatus of a single-lens reflex camera, comprising:
    a mirror which moves between a charge completion position and a photographing position;
    a mirror driving means for moving the mirror between the charge completion position and the photographing position;
    a mirror holding means for maintaining the mirror driving means in the charge completion state;
    a mirror charge detecting means for detecting that the mirror driving means is in the charge completion state;
    a mode setting means for setting a continuous photographing mode; and,
    a control means for releasing the hold of the mirror by the mirror holding means when the mirror charge detecting means detects the charge completion position of the mirror, at the continuous photographing mode.

9. A control apparatus of a single-lens reflex camera, according to claim 8, wherein said mirror driving means comprises a spring member which moving the mirror to the photographing position, and a driving member which moves the mirror to the charge completion position while biasing the spring member.

10. A control apparatus of a single-lens reflex camera, according to claim 9, wherein said driving member comprises a motor.

11. A control apparatus of a single-lens reflex camera, according to claim 10, wherein said mirror holding means comprises an engaging member which holds the spring member at the charge completion position.

12. A control apparatus of a single-lens reflex camera, according to claim 11, wherein said control means comprises a magnet which disengages the engaging member.

13. A control apparatus of a single-lens reflex camera, according to claim 8, wherein said driving means comprises a driving member which moves the mirror between the photographing position and the charge completion position, and wherein said mirror holding means stops the driving member when the mirror is in the charge completion position, so that the control means drives the driving member to move the mirror to the photographing position.

14. A control apparatus of a single-lens reflex camera, according to claim 13, wherein said driving member comprises a motor.

15. A control apparatus of a single-lens reflex camera, comprising:
   a mirror which moves between a charge completion position and a photographing position;
   a mirror driving means for moving the mirror between the charge completion position and the photographing position;
   a mirror holding means for maintaining the mirror at the charge completion position;
   a mirror charge detecting means for detecting the completion of the mirror charge;
   a mirror upward movement detecting means for detecting that the mirror is in the photographing position;
   a mode setting means for setting a continuous photographing mode;
   a film winding means for winding a film to a photographable position;
   a wind completion detecting means for detecting the completion of the winding of the film;
   a shutter charge means for effecting the charge of a shutter;
   a shutter holding means for holding the shutter at the charge completion position;
   a shutter charge detecting means for detecting the completion of the shutter charge; and,
   a control means for releasing the hold of the mirror by the mirror holding means when the mirror charge detecting means detects the charge completion position of the mirror, at the continuous photographing mode,
   said control means releasing the shutter holding means when the mirror upward movement detecting means detects that the mirror is in the photographing position, when the wind completion detecting means detects the completion of the winding of the film, and when the shutter charge detecting means detects the completion of the shutter charge.

16. A control apparatus of a single-lens reflex camera, according to claim 15, wherein the shutter charge is completed before the mirror comes to the photographing position as a result of the release of the mirror holding means.

17. A control apparatus of a single-lens reflex camera, according to claim 15, wherein the shutter charge is completed and the winding of the film is completed before the mirror comes to the photographing position as a result of the release of the mirror holding means.

18. A control apparatus of a single-lens reflex camera, according to claim 15, wherein said mirror driving means comprises a spring member which moving the mirror to the photographing position, and a driving member which moves the mirror to the charge completion position while biasing the spring member.

19. A control apparatus of a single-lens reflex camera, according to claim 18, wherein said driving member comprises a motor.

20. A control apparatus of a single-lens camera, according to claim 19, wherein said mirror holding means comprises an engaging member which holds the mirror at the charge completion position against the spring member.

21. A control apparatus of a single-lens reflex camera, according to claim 20, wherein said control means comprises a magnet which disengages the engaging member.

22. A control apparatus of a single-lens reflex camera, according to claim 15, wherein said driving means comprises a driving member which moves the mirror between the photographing position and the charge completion position, and wherein said mirror holding means stops the driving member when the mirror is in the charge completion position, so that the control means drives the driving member to move the mirror to the photographing position.

23. A control apparatus of a single-lens reflex camera, according to claim 22, wherein said driving member comprises a motor.

* * * * *